United States Patent Office 3,565,549
Patented Feb. 23, 1971

3,565,549
PROCESS FOR PREPARING REINFORCED
RESINOUS STRUCTURES
Hyman R. Lubowitz, Redondo Beach, and Robert W. Vaughan, Manhattan Beach, Calif., asisgnors to TRW Inc., Redondo Beach, Calif., a corporation of Ohio
No Drawing. Continuation-in-part of application Ser. No. 650,625, July 3, 1967. This application June 20, 1968, Ser. No. 738,403
Int. Cl. C03c 25/02; C08g 20/32
U.S. Cl. 117—126                    10 Claims

ABSTRACT OF THE DISCLOSURE

This invention is directed toward the process of preparing reinforced laminates of improved thermal stability which comprises impregnating a reinforcing material, e.g. glass fibers, with an effective amount of a precursor of a polyimide prepolymer i.e. polyamide-acid and subsequently subjecting the impregnated material to heat and pressure to obtain a cured, reinforced, structure. The precursors of the polyimide prepolymers used for impregnating the reinforcing materials are obtained by coreacting a polyamine e.g. an aromatic diamine and a polyanhydride e.g. an aromatic dianhydride with a specific end-capping or terminal monoanhydride characterized by the formula:

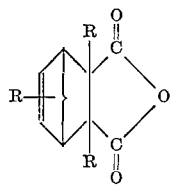

wherein R is selected from the group consisting of a hydrogen atom and lower alkyl groups. The polyamide-acids or precursors of the prepolymers are applied as an organic solution to the reinforcing materials and converted in situ to the prepolymers by the application of heat with temperatures ranging up to about 260° C. Subsequently, the prepolymer-impregnated reinforcing materials are cured at temperatures ranging up to about 350° C. under pressures ranging up to about 1,000 p.s.i. to obtain reinforced materials impregnated with high-molecular weight polyimide resins.

SPECIFICATION

This application is a continuation-in-part of applicants copending application Ser. No. 650,625 filed on July 3, 1967, now Pat. No. 3,528,950.

This invention relates to the preparation of reinforced laminates of improved thermal stability and to the method of preparing same which comprises impregnating various reinforcing materials e.g. glass cloth, etc. with an effective amount of a polyamide-acid in the form of an organic solution and subsequently heating the impregnated reinforcing materials at temperatures ranging up to about 260° C. to remove the volatile material and to convert the polyamide-acid to polyimide prepolymer. The polyimide prepolymer impregnated materials are subjected then to temperatures ranging up to about 350° C. at pressures ranging from about atmospheric to 1,000 p.s.i. until a completely cured resin is obtained in situ dispersed throughout the reinforcing materials.

The polyamide-acids referred to herein as precursors of the polyimide prepolymers are obtained by coreacting approximately stoichiometric amounts of a polyfunctional amine, e.g. an aromatic diamine, a polyfunctional anhydride, e.g. an aromatic dianhydride and a specific monoanhydride characterized by the formula:

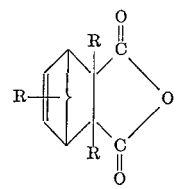

wherein R is selected from the group consisting of a hydrogen atom and a lower alkyl radical.

More specifically, this invention relates to polyimide reinforced structures, e.g. glass laminates obtained by impregnating reinforcing materials with the precursor of a polyimide prepolymer which in turn is capable of being pyrolytically polymerized, in situ, to a higher molecular weight thermally stable polyimide resin. These polyimide resins are obtained, dispersed throughout the reinforcing materials by applying an organic solution of the polyamide-acid to the materials followed by a heating process whereby the precursors are converted to relatively low molecular weight polyimide prepolymers which are highly stable at ambient temperatures. These imide prepolymers however, are capable of being converted at temperatures above approximately 200° C. to higher molecular weight polyimide resins which bonds the reinforcing material to give a thermally stable composite. The polyimide prepolymers obtained in situ from the polyamide-acid precursors may have average molecular weights ranging from about 500 to 6,000 and more preferably from 500 to 3,000 and are sufficiently stable at ambient temperatures to allow for handling and storage under conditions considered adverse to the polyimide prepolymers used heretofore.

The polyimide reinforced laminated structures presently available are known primarily because of their outstanding physical and chemical properties and particularly because of their stability at elevated temperatures. Thus, because of these and other attractive characteristics, the polyimide reinforced structures, e.g. glass laminates, have found numerous applications in areas where high-strength and high-temperature materials are needed. However, while the presently available polyimides are desirable they are nevertheless economically at a disadvantage because of the difficulties encountered in handling the prepolymers and in processing laminates and composites.

The polyimides prepared heretofore, for example, were obtained by coreacting a dianhydride and a diamine to produce polyamide-acids by chain extension. Materials impregnated with these intermediate polyamide-acids were required to be hermetically sealed and refrigerated if they were not to be cured within a reasonable time, because of their instability at room temperatures. When the polyamide-acid impregnated materials were ultimately cured at elevated temperatures, e.g. for periods ranging up to 16 hours or more, there was a substantial amount of volatile matter given off due to the evaporation of solvent and the cyclization curing reaction of the polyamide-acid in converting to polyimide. Thus, in curing the amide-acid impregnated materials it became necessary to use a special cure process which allowed for the escape of an appreciable amount of volatile matter, e.g. water and organic solvent, in order to avoid interstitial voids which otherwise would cause an inferior structure.

It has been found in accordance with this invention that reinforced polyimide structures may be obtained by using a rapid-curing, polyimide prepolymer which avoids the need to cure the polyamide-acid intermediate in situ with the reinforcing materials in the final stages of the process. In comparison, the reinforced materials of this invention are obtained by a curing mechanism which is believed to be unique in that rather than polyamide-acid curing, polymerization of the polyimide prepolymers takes place upon fabrication in situ by the mere application of heat, i.e., pyrolytic polymerization essentially without the evolution of volatile matter. The technique comprises impregnating the reinforcing materials with an organic solution of the polyamide-acids followed by a drying operation at temperatures ranging up to 260° C. which not only removes the solvent, but also the volatiles formed during the cyclization of the polyamide-acid to the lower molecular weight polyimide prepolymers. The prepolymer impregnated materials are substantially stable at ambient temperatures and therefore may be stored if desired without any unnecessary precautions for later use. Upon processing in the temperature range of 200° C. to 350° C., the impregnated materials form integral structures due to the pyrolytic polymerization of the polyimide prepolymers. The materials impregnated with the polyimide resins in accordance with this invention are thermally stable and for that reason may be used for a variety of purposes including, for example, heat-stable laminates, ablative heat-shields, and various other purposes particularly in the aerospace industry.

Accordingly, it is an object of this invention to provide a novel process for preparing a polyimide prepolymer, in situ, as an impregnant for various reinforcing materials.

It is another object of this invention to provide a process of preparing precursors of polyimide prepolymers as an impregnant for reinforcing materials which may be converted, in situ, to polyimide prepolymers of low molecular weight which are easily converted by the application of heat to polyimide resins.

It is another object of this invention to provide a process for preparing reinforced articles or laminated structures comprising reinforcing materials impregnated with a thermally-stable, rapid-curing precursor of a polyimide prepolymer.

It is another object of this invention to provide a process of preparing polyimide prepolymer impregnated reinforcing materials capable of being cured by the application of heat to resin bonded laminates of improved thermal stability.

It is still another object of this invention to provide a process of preparing laminated structures substantially free of voids by utilizing precursors capable of being converted in situ to prepolymers which in turn are capable of being cured by the application of heat to thermally-stable polyimide resins.

It is still a further object of this invention to provide a process whereby reinforcing materials impregnated with polyimide prepolymers are converted pyrolytically to thermally stable polyimide resins without the evolution of a substantial amount of volatiles.

These and other objects of the invention will become apparent from a further and more detailed description as follows:

More specifically this invention relates to a process of preparing reinforced resinous laminates, e.g. glass fiber laminates of improved thermal stability which comprises impregnating reinforcing materials with an effective amount of an organic solution of a polyamide-acid, i.e. the precursor of the polyimide prepolymer. The impregnated reinforcing materials containing the precursor are converted in situ to low molecular weight polyimide prepolymers by the application of heat which completes the cyclization reaction and removes the volatiles from the structure. The laminated structures containing the polyimide prepolymers are subsequently cured by subjecting the impregnated materials to temperatures ranging from about 200° C. to 350° C. at pressures ranging from about atmospheric to 1,000 p.s.i.

The polyamide-acids, i.e., precursors of the prepolymers are obtained by coreacting approximately stoichiometric amounts of a polyfunctional amine, e.g. a diamine, a polyfunctional anhydride, e.g. a dianhydride and a specific monoanhydride or end-capping group having the formula:

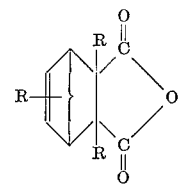

wherein R is selected from the group consisting of a hydrogen atom and a lower alkyl radical having 1–4 carbon atoms.

It has been found that comparatively high-molecular weight polyimide resins can be dispersed throughout the reinforcing materials, e.g. glass fibers, by pyrolytically polymerizing the polyimide prepolymers which have average molecular weights ranging from about 500 to 6,000 and preferably from 500 to 3,000. The prepolymers are polymerized, in situ, to obtain improved laminated structures at temperatures ranging from about 200 to 350° C. and preferably at temperatures ranging from about 250 to 350° C. The precursors or polyamide-acids are obtained by coreacting polyamines, polyanhydrides and a specific monoanhydride in approximately stoichiometric or predetermined amounts under conditions well known in the art for preparing polyimides. The prepolymers obtained from the polyamide-acids may be characterized as chain extended polyimides of relatively low molecular weight which contain an aliphatic and/or aromatic backbone with a specified end-capping or terminal group. This particular end-capping group, e.g. derived from 3,6-endomethylene-1,2,3,6-tetrahydrophthalic anhydride, is stable at room and moderately elevated temperatures, but is capable of becoming chemically reactive by the application of elevated temperatures to form substantially cured polyimide resins. It is believed that the terminal groups react with the application of heat, thereby causing the low molecular weight polyimide prepolymers to add essentially end to end to form macromolecules having average molecular weights of at least 10,000.

The higher molecular weight polyimide resins may be obtained in situ from the precursors as illustrated below:

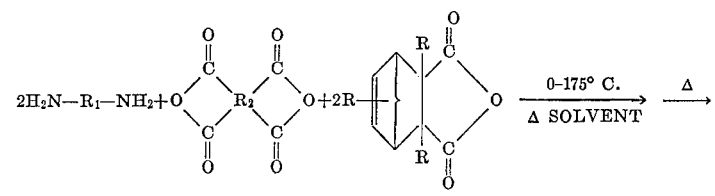

DIAMINE    DIANYDRIDE    MONOANHYDRIDE

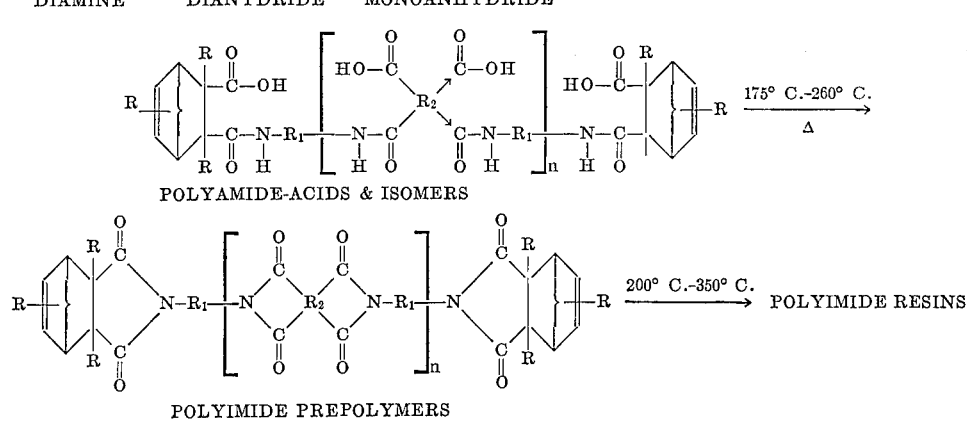

As stated, the precursors or polyamide-acids may be obtained by conventional techniques, for example, by reacting a chemical equivalent of a polyamine, i.e. an aromatic diamine with an equivalent of anhydride comprising a mixture of a dianhydride and a specific monoanhydride as characterized above, e.g. 3,6-endomethylene-5-methyl-1,2,3,6-tetrahydrophthalic anhydride. The monoanhydride is present in the anhydride mixture in an amount sufficient to end-cap the polyimide prepolymers. Thus, depending upon the average molecular weight of the prepolymers, the relative amount of the monoanhydride in the mixture will vary, e.g. from about 5.0 to 60 mole percent. It is essential that the total chemical equivalents of the polyamine, i.e. diamine substantially equal the total equivalents of the dianhydride and monoanhydride so that a completely cyclized polyimide prepolymer can be obtained in situ with the reinforcing material.

In preparing the laminated materials or reinforced articles, for example, the polyamide-acids are prepared in an organic solution, e.g. dimethyl formamide, etc. wherein said precursors are present in amounts ranging from about 10 to 65 percent and more preferably 25 to 50 percent by weight of the solvent. Following the application of the precursors to the reinforcing materials, excess solvent may be removed at elevated temperatures to reduce the total reaction time and to obtain substantially dried materials. Subsequently, the impregnated materials are subjected to elevated temperatures ranging up to about 260° C. until completely cyclized, comparatively low molecular weight polyimide prepolymers are obtained in situ.

The prepolymer impregnated materials are then subjected to still higher temperatures ranging up to about 350° C. under pressures ranging from atmospheric to 1,000 p.s.i. or more until completely cured resinous structures of improved thermal stability are obtained. Under these conditions of pressure and heat, the cyclized imide prepolymers are cured by pyrolytic polymerization with the evolution of a minimum amount of volatiles to a higher molecular weight resin which bonds the reinforcing material to form the structure.

The reinforcing materials may be selected from a variety of known organic or inorganic powders or fibers including, for example, carbon, powdered metals, silicates, asbestos, synthetic fibers, natural fibers, metal filaments, metal oxide powders, and particularly glass fibers, e.g. glass mats, etc.

In preparing the precursors of the prepolymers for the preparation of the structures, various polyfunctional amines such as the diamines, triamines and tetramines may be used. However, the preferred polyamines are the diamines. The following represent the polyfunctional amines which may be used in preparing the resinous structures which includes, for example:

3-methoxyhexamethylene diamine;
2,5-dimethylhexamethylene diamine;
2,5-dimethylheptamethylene diamine;
5-methylnonamethylene diamine;
1,4-diamino-cyclohexane;
1,2-diamino-octodecane;
2,5-diamino-oxadiazole;
2,2-bis(4-aminophenyl) hexafluoror propane;
N-(3-aminophenyl)-4-aminobenzamide;
metaphenylene diamine;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis(4-amino-phenyl) diethyl silane;
bis(4-amino-phenyl) diphenyl silane;
3,3'-dichloro-benzidine;
bis-(4-amino-phenyl) phenyl phosphine oxide;
bis-(4-amino-phenyl)-N-phenylamine;
bis-(4-amino-phenyl)-N-methyl-amine;
1,5-diamino-naphthalene;
3,3'-dimethyl-4,4'-diamino-biphenyl;
3,4'-dimethyl-3',4-diamino-biphenyl;
3,3'-dimethoxy benzidine;
2,4-bis(beta-amino-t-butyl) toluene;
para-bis-(2-methyl-4-amino-pentyl) benzene;
para-bis-(1,1-dimethyl-5-amino-pentyl)benzene;
m-xylylene diamine;
3-methylheptamethylene diamine;
4,4-dimethyl-heptamethylene diamine;
2,11-diamino-dodecane;
1,2-bis-(3-aminopropoxy) ethane;
2,2-dimethyl propylene diamine;
1,3-diamino adamantane;
3,3'-diamino-1,1' diadamantane;
3,3'-diaminomethyl-1,1'-diadamantane;

bis(para-amino-cyclohexyl) methane;
hexamethylene diamine;
heptamethylene diamine;
octamethylene diamine;
nonamethylene diamine; and
decamethylene diamine.

The polyfunctional anhydrides, e.g. dianhydrides which may be employed for purposes of this invention include the following:

bis(3,4-dicarboxyphenyl) methane dianhydride;
bis(3,4-dicarboxyphenyl) sulfone dianhydride;
benzene-1,2,3,4-tetracarboxylic dianhydride;
3,4,3',4'-benzophenone tetracarboxylic dianhydride;
pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2'-bis(3,4-dicarboxyphenyl) propane dianhydride;
3,4,9,10-perylene tetracarboxylic dianhydride;
bis(3,4-dicarboxyphenyl) ether dianhydride;
naphthalene-1,2,4,5-tetracarboxylic dianhydride;
naphtalene-1,4,5,8-tetracarboxylic dianhydride;
decahydronaphthalene-1,4,5,8-tetracarboxylic dianhydride;
phenanthrene-1,8,9,10-tetracarboxylic dianhydride;
2,2-bis(2,3-dicarboxyphenyl) propane dianhydride;
1,1-bis(3,4-dicarboxyphenyl)ethane dianhydride;
bis(2,3-dicarboxyphenyl) methane dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride; and
2,3,6,7-tetrachloronaphthalene-1,4,5,8-tetracarboxylic dianhydride.

The following examples illustrate the reactants which may be used in preparing organic solutions of the precursors of the polyimide prepolymers.

EXAMPLE I

Approximately 40.7 parts by weights of 4,4'-methylene dianiline, 32.8 parts by weight of 3,6-endomethylene-1,2,3,6-tetrahydrophthalic anhydride and 33.9 parts by weight of 3,3',4,4',-benzophenone tetracarboxylic acid dianhydride were dissolved in 170 parts by weight of dimethylformamide.

EXAMPLE II

A solution was prepared by mixing approximately 1,000 parts by weight of dimethylformamide and 100 parts by weight of toluene to which was added 122.7 parts by weight of 4,4-oxydianiline. The solution was stirred until all of the diamine was in solution and 98.4 parts by weight of 3,6 - endomethylene - 1,2,3,6-tetrahydrophthalic anhydride and 100.8 parts by weight of 3,3',4,4'-benzophenone tetracarboxylic acid dianhydride were added slowly, with stirring, until a solution was obtained.

EXAMPLE III

Approximately 87.0 parts by weight of 4,4'-oxydianiline were dissolved in a solvent mixture of 700 parts by weight of dimethylformamide and 700 parts by weight of toluene. To this solution was added 65.6 parts by weight of 3,6-endomethylene 1,2,3,6-tetrahydrophthalic anhydride and 63.0 parts by weight of 1,4,5,8-naphthalene tetracarboxylic dianhydride.

EXAMPLE IV

Two solutions were prepared consisting of approximately 57.43 parts by weight of 4,4' methylene dianiline with 75.0 parts by weight of dimethylformamide and of 35.58 parts by weight of 3,6-endomethylene 1,2,3,6-tetrahydrophthalic anhydride with 40.0 parts by weight of dimethylformamide. A third mixture was prepared consisting of approximately 58.36 parts by weight of 3,3',4,4'-benzophenone tetracarboxylic dianhydride with 43.5 parts by weight of dimethylformamide. These three preparations were then blended together and reacted to provide a polyamide-acid solution.

The above solutions of polyamide-acids were used for impregnating reinforcing materials, i.e. glass cloth by a method which comprises, for example, impregnating the fabric with the precursor of the propolymers, i.e. the amide-acids prior to complete imidization and then later imidizing the precursors on the cloth to a stable prepolymer. The prepolymer impregnated cloth was subsequently heated to temperatures ranging up to about 350° C. for an hour or more with laminating pressures ranging from about 200–600 p.s.i. More specifically, low-void content laminates e.g. with less than 2% of total volatiles may be prepared, for example, by utilizing cure cycles of about 350° C. for a period of about 60 minutes at a pressure of about 200 p.s.i. for a ⅛ inch thick laminate). For thicker laminates, however, an additional cure time of about 30 minutes should be provided for every inch of thickness, e.g. ⅜ to 1-inch thick laminates may be cured in approximately 90 minutes. In addition to glass cloth, other reinforcing materials including silica, graphite, asbestos, etc. may be used in preparing laminated materials which are specially useful in fabriacting products such as heat shields and exhaust nozzles for various high-temperature purposes.

The solvents useful in preparing solutions of the polyamide-acids include the organic solvents whose functional groups do not react with the precursors. Normally, organic solvents comprising the N,N'-dialkyl-carboxylamides are useful. The preferred solvents, however, are the lower molecular weight materials including, N,N-dimethylformamide, N,N-dimethylacetamide, N,N-diethylformamide, N,N-diethylacetamide, N,N-dimethyl-methoxyacetamide. In addition, solvents which may be used include dimethylsulfoxide, N-methyl-2-pyrrolidone, pyridine, formamide, N-methyl-formamide butyrolactone, etc. These solvents may be used either alone or in combination with other organic liquids including for example benzene, dioxane, butyrolactone, toluene, xylene, cyclohexane, and mixtures thereof.

The following data illustrates the products of this invention.

TABLE I

The laminating varnishes comprising the precursors of the polyimide prepolymers may be characterized as follows:
Color—Amber
Percent solids—40±2.0
Solvent—Dimethylformamide (DMF)
Viscosity at 25° C.—200–300 centipoises
Weight per gallon, lbs.—9.1–9.2

Laminated prepregs made in accordance with this invention were prepared by using Style 181E glass cloth having an I–545 finish (Hess-Goldsmith). Press grade prepregs were prepared and were characterized as follows:

| Prepreg properties | Test method | Results |
|---|---|---|
| Resins solids content, percent | 4 hrs. at 593° C | 25–30. |
| Volatiles content, percent | 30 min. at 316° C | 2 maximum. |
| Drapability | | Low. |
| Tack | | None. |

TABLE II

Test panels prepared with Style 181E glass prepregs were molded in a preheated press at 200 p.s.i. at about 316° C. for about one hour. The following test results were obtained:

| Property | Room temperature | Testing temperatures | |
|---|---|---|---|
| | | 288° C. | 316° C. |
| Flexural strength, p.s.i. | 89,000–95,000 | 72,000–74,000 | 67,000–71,000 |
| Flexural modulus ($\times 10^6$ p.s.i.) | 3.4–3.8 | 3.6–3.8 | 3.5–3.6 |
| Flexural strength after 2 hrs. boil in water, p.s.i. | 87,000–92,000 | | |
| Flexural strength, p.s.i.: | | | |
| After 500 hrs. at 288° C. | | 54,000–64,000 | |
| Aftr 500 hrs. at 316° C. | | | 39,000–46,000 |
| Flexural modulus ($\times 10^6$ p.s.i.): | | | |
| After 500 hrs. at 288° C. | | 3.5–3.8 | |
| After 500 hrs. at 316° C. | | | 2.9–3.4 |
| Specific gravity | 1.99–2.05 | | |
| Resin content, percent | 24–26 | | |
| Barcol hardness | 60–70 | | |
| Void content | (¹) | | |

¹ Less than 2%.

Recent trends toward operating at high temperatures in the electrical and missile areas have stimulated activity for the development of heat-resistant organic resins which may be used for preparing laminated articles of high-thermal stability. Accordingly, the laminated structures obtained by the processes of this invention were developed for these purposes and may be characterized as having outstanding physical and thermal stability.

While this invention has been described with respect to a number of specific embodiments, it is obvious that there are other variations and modifications which may be resorted to without departing from the spirit and scope of the invention as particularly pointed out in the appended claims.

What is claimed is:

1. A process for preparing reinforced resinous laminates of improved thermal stability which comprises impregnating reinforcing materials with an effective amount of an organic solution of polyamide-acids, heating the impregnated reinforcing materials to convert the amide-acids to polyimide prepolymers having average molecular weights ranging from about 500 to 6,000 and subsequently curing said prepolymers by subjecting the prepolymer-impregnated materials to temperatures ranging from about 200° C. to 350° C. at pressures ranging from about atmospheric to 1,000 p.s.i.; said polyamide-acids obtained by coreacting approximately stoichiometric amounts of polyamines, polyanhydrides and a monoanhydride having the formula:

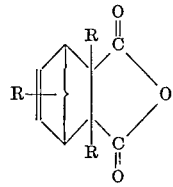

wherein R is selected from the group consisting of a hydrogen atom, and a lower alkyl radical.

2. The process of claim 1 further characterized in that the polyamide-acids are present in the organic solution in an amount ranging from about 25 to 50 percent by weight of the solvent.

3. The process of claim 1 further characterized in that the solvent comprises N,N'-dialkyl carboxylamides.

4. The process of claim 3 further characterized in that the solvent comprises dimethyl formamide.

5. The process of claim 1 further characterized in that the reinforcing materials impregnated with the polyamide-acids are heated to temperatures ranging up to about 260° C. to convert said amide-acids to the polyimide prepolymers.

6. The process of claim 1 further characterized in that the reinforcing materials impregnated with the prepolymers are cured at temperatures ranging from about 250° C. to 325° C. at pressures ranging from about 200 to 600 p.s.i.

7. The process of claim 1 further characterized in that the reinforcing materials comprise glass fibers.

8. The process of claim 1 further characterized in that the polyamines comprise at least one aromatic diamine, the polyanhydrides comprise at least one aromatic dianhydride and the monoanhydride is characterized by the formula wherein R is a hydrogen atom.

9. The process of claim 1 further characterized in that the polyamide-acids are obtained by coreacting approximately stoichiometric amounts of at least one aromatic diamine and a mixture of an aromatic dianhydride and the monohydride wherein the monoanhydride ranges from about 5.0 to 60 mole percent of the anhydride mixture.

10. The process of claim 1 further characterized in that the polyimide prepolymers have average molecular weights ranging from about 500 to 3,000.

References Cited

UNITED STATES PATENTS 3,179,634   4/1965   Edwards _____ 117—126X

MURRAY KATZ, Primary Examiner

D. COHEN, Assistant Examiner

U.S. Cl. X.R.

117—161; 260—78